(12) United States Patent
Bauer

(10) Patent No.: US 7,802,762 B2
(45) Date of Patent: Sep. 28, 2010

(54) AUTOMOBILE CABLE/CONDUIT RETAINER

(75) Inventor: Christian Willrich Bauer, Karlsfeld (DE)

(73) Assignee: ITW Automotive Products GmbH & Co. KG, Iserlohn (DE)

(*) Notice: Subject to any disclaimer, the term of this patent is extended or adjusted under 35 U.S.C. 154(b) by 51 days.

(21) Appl. No.: 11/916,882

(22) PCT Filed: Jun. 8, 2006

(86) PCT No.: PCT/IB2006/001515

§ 371 (c)(1), (2), (4) Date: Dec. 7, 2007

(87) PCT Pub. No.: WO2006/131821

PCT Pub. Date: Dec. 14, 2006

(65) Prior Publication Data

US 2008/0197241 A1   Aug. 21, 2008

(30) Foreign Application Priority Data

Jun. 9, 2005   (DE) .................. 10 2005 026 471

(51) Int. Cl.
*F16L 3/22* (2006.01)

(52) U.S. Cl. ............... 248/68.1; 248/74.2; 248/72; 24/555

(58) Field of Classification Search ............ 248/74.2, 248/62, 68.1, 71, 73, 65, 74.1, 74.3, 49, 56, 248/72, 548; 24/555, 545, 561, 339, 484

See application file for complete search history.

(56) References Cited

U.S. PATENT DOCUMENTS 3,163,712 A  * 12/1964  Cochran .................. 174/164
3,262,662 A  *  7/1966  Gastaldi .................. 248/68.1
3,444,596 A  *  5/1969  Soltysik ..................... 248/73
3,584,348 A  *  6/1971  Soltysik .................. 248/68.1
4,358,080 A    11/1982  Wolker et al.
4,437,633 A     3/1984  Andre et al.
4,541,602 A  *  9/1985  Potzas .................... 248/544
4,566,660 A  *  1/1986  Anscher et al. .......... 248/74.2
4,591,285 A  *  5/1986  Nelson .................... 403/11

(Continued)

FOREIGN PATENT DOCUMENTS

CN           1192971 A        9/1998

OTHER PUBLICATIONS

ISR for PCT/IB2006/001515 mailed Sep. 20, 2006.

*Primary Examiner*—Kimberly T Wood
(74) *Attorney, Agent, or Firm*—Lowe Hauptman Ham & Berner LLP

(57) ABSTRACT

A retainer for a conduit, cable or the like, preferably a fluid conduit in an automobile, includes a retainer body having attaching portions to be mounted to an automobile body part, damping portions for dampening conduit vibrations, an insertion portion that constricts from the outside to the inside, and a receiving portion for the conduit. The retainer body is integrally molded of a plastic material. The receiving portion has three or more engaging portions which are arranged circumferentially of and engage the conduit and which are connected by resilient arms to the retainer body in a manner that, in the event of conduit vibrations, the resilient arms shall yield easily and elastically like leaf springs in all axial and radial directions and shall decouple the vibration-induced forces from the automobile body part.

6 Claims, 2 Drawing Sheets

U.S. PATENT DOCUMENTS

| | | | | |
|---|---|---|---|---|
| 4,655,424 A * | 4/1987 | Oshida | | 248/73 |
| 4,717,100 A * | 1/1988 | Klein | | 248/73 |
| 4,762,296 A * | 8/1988 | Kraus et al. | | 248/74.2 |
| 4,917,340 A * | 4/1990 | Juemann et al. | | 248/74.2 |
| 5,020,749 A * | 6/1991 | Kraus | | 248/74.3 |
| 5,033,701 A * | 7/1991 | Kraus | | 248/68.1 |
| 5,184,794 A * | 2/1993 | Saito | | 248/68.1 |
| 5,230,496 A * | 7/1993 | Shillington et al. | | 248/316.5 |
| 5,271,587 A * | 12/1993 | Schaty et al. | | 248/68.1 |
| 5,460,342 A | 10/1995 | Dore et al. | | |
| 5,535,969 A * | 7/1996 | Duffy, Jr. | | 248/68.1 |
| 5,568,906 A * | 10/1996 | Hahn et al. | | 248/74.1 |
| 5,588,683 A * | 12/1996 | Schliessner | | 285/62 |
| 5,765,787 A * | 6/1998 | de Beers et al. | | 248/73 |
| 5,947,426 A * | 9/1999 | Kraus | | 248/74.2 |
| 6,371,419 B1 * | 4/2002 | Ohnuki | | 248/74.2 |
| 6,883,762 B2 * | 4/2005 | Miura et al. | | 248/74.2 |
| 6,915,990 B2 * | 7/2005 | Maruyama | | 248/68.1 |
| 7,328,873 B2 * | 2/2008 | Suzuki et al. | | 248/68.1 |
| 2002/0088095 A1 | 7/2002 | Hahn | | |
| 2004/0065785 A1 * | 4/2004 | Miura et al. | | 248/62 |
| 2004/0113027 A1 * | 6/2004 | Nakanishi | | 248/68.1 |
| 2005/0178930 A1 * | 8/2005 | Yon | | 248/68.1 |

* cited by examiner

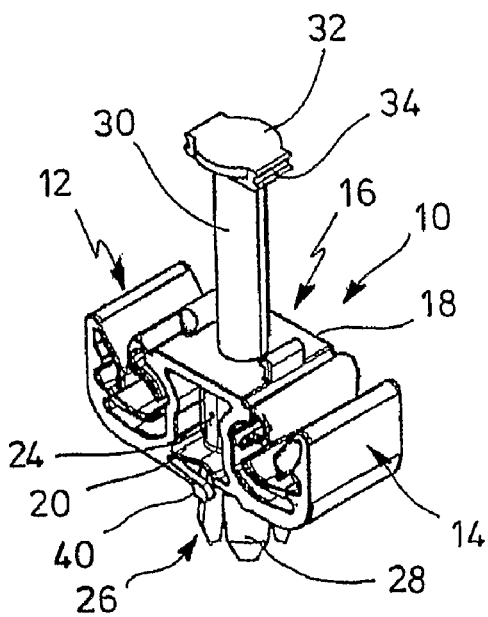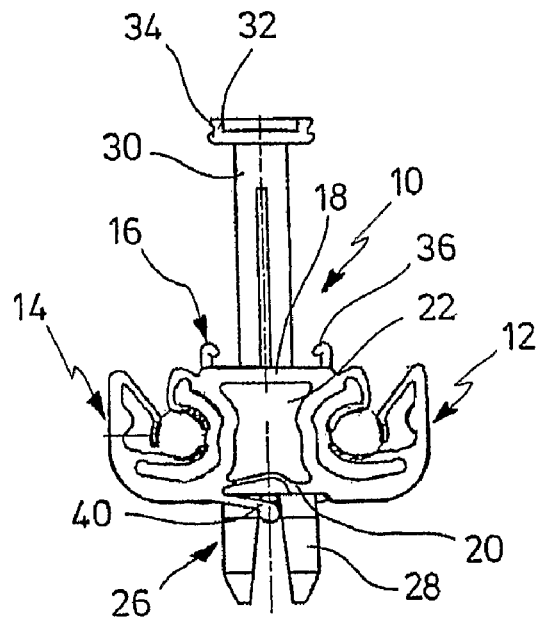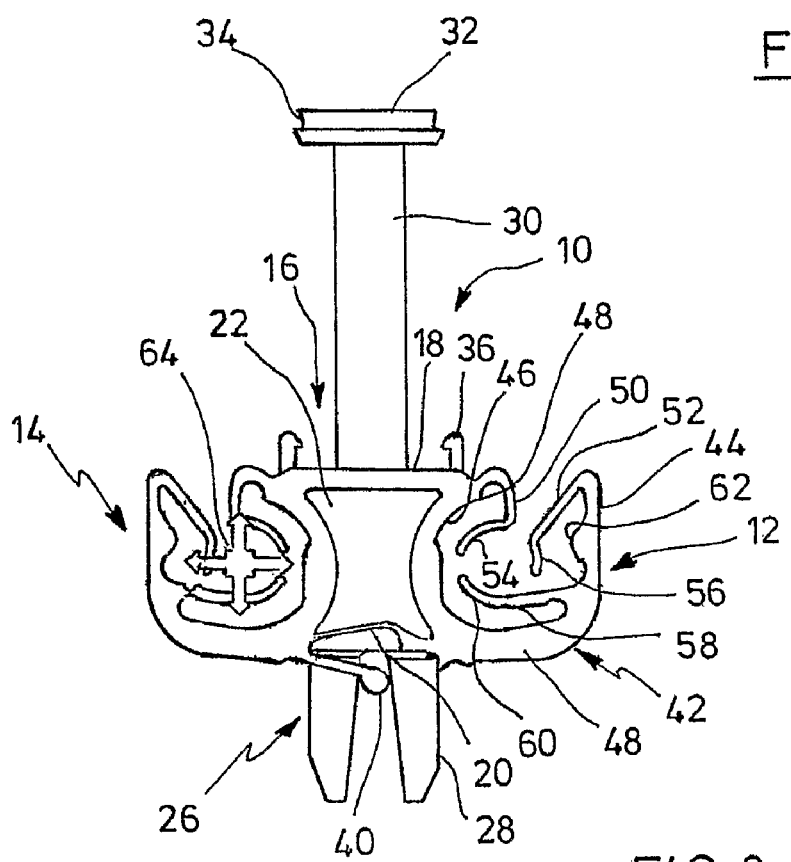

AUTOMOBILE CABLE/CONDUIT RETAINER

RELATED APPLICATIONS

The present application is based on International Application Number PCT/IB2006/001515 filed Jun. 8, 2006, and claims priority from, German Application Number 10 2005 026 471.9, filed on 9 Jun. 2005, the disclosures of which are hereby incorporated by reference herein in their entirety.

TECHNICAL FIELD

The present invention relates to an automobile cable/conduit retainer.

BACKGROUND

Various automobile cable/conduit retainers are known. These retainers are affixed either using so-called studs welded onto automobile body parts or are mounted in holes using expansion rivets or the like. The retainers comprise a conic intake portion receiving at its narrow cross-section the cable or conduit being forced through it, whereupon such cable/conduit is secured in a receiving portion. The cable or conduit is reliably held in said receiving portion and cannot be torn out of it on account of its accidental displacements.

In cars having ABS devices, brake conduits for braking systems will be loaded impulsively depending on the braking situation when said devices are actuated. As a result the brake conduits are subjected to strong vibrations that may be transmitted to the automobile body parts. Desirably these vibrations should be shunted off the body parts. It is known presently to manufacture a retainer by binary injection molding and to make the affixation elements of a harder plastic than the part constituting the cable/conduit receiving portion. The receiving portion is made of a comparatively soft material and thereby reduces vibrations of the seated cable, i.e. it substantially circumvents their transmission to the body part. This design however incurs the drawback that the binary injection molds are comparatively expensive.

SUMMARY

The objective of the present invention is to create a retainer for conduits, especially fluid conduits, that are subject to vibrations, whereby this retainer can be manufactured more economically while allowing optimal vibrational decoupling from its base, for instance the automobile body part, and providing adequate clamping force.

The body of the retainer of the invention is integrally made of a plastic material. The receiving portion comprises three or more engaging portions engaging the conduit periphery from different sides and connected by resilient arms to the retainer body in a manner that the resilient arms are highly compliant in all directions for small amplitude radial displacements of said conduit.

In one embodiment mode of the present invention, the engaging portions have arcuate rest faces approximately matching the conduit radius. As a result the conduit is gripped at various sites across its circumference in relatively large scale manner. Radial motions of the conduit are transmitted by the engaging portions to the associated resilient arms which are correspondingly highly compliant, as a result of which the conduit vibrations and hence the forces they entail are decoupled from the automobile body part to which the retainer body is affixed.

A number of approaches may be used to reduce to practice the solution of the present invention. One embodiment mode of this invention provides that the retainer body comprises an approximately U-shaped portion with two legs and one connecting yoke, two resilient arms being connected to the free ends of said legs and constituting the cuneal intake or insertion portion, a third resilient arm being bound to the inside of one leg and extending approximately parallel to the said yoke to the other leg. In this manner the received conduit rests by means of the resilient arms on the retainer body, said resilient arms thereby receiving all radial and axial vibrations and shunting them from the automobile body part.

While again two resilient arms constitute an insertion portion of an alternative embodiment mode of the present invention, however one of these two arms is integrated into the inside of the said insertion portion and runs obliquely in the direction of the aperture, and together with the opposite resilient arm constitutes an insertion portion. In this embodiment mode the engaging portion is not located at the free end of this resilient arm, but between its ends.

In order to assure especially effective compliance, a further embodiment mode of the present invention allows using resilient arms with partly reduced cross-sections, preferably near their connection site (fastening) to the retainer body.

A retainer body of the retainer of the present invention is connected to an appropriate attaching portion that may be molded integrally with this retainer. The attaching portion assumes either the form of an expansion rivet, whereby it may be mounted in a hole of an automobile body part, or alternatively it may have so-called percussion or expansion nut allowing slipping or hammering the attaching portion onto a so-called stud conventionally having a thread or annular grooves.

When mounting the retainer on an automobile body part, this retainer is pressed by an underside against an associated surface of the said automobile body part. As regards an embodiment mode of the present invention, a resilient portion is centrally constituted at the retainer body underside and rests against the surface of the automobile body part. This feature assures further vibrational decoupling from the automobile body part when the holder structure underside is spaced from the automobile body part and the retainer body in turn is able to pivot.

The present invention offers several advantages. Decoupling vibrations from the automobile body part is attained using a single-component plastic and hence allows economical manufacture. The retainer of the present invention is compact and is as effective as conventional retainers regarding securing the conduit. The resilient arms are designed to easily yield to low amplitude vibrations while in the presence of higher, more or less static loads they will react with a higher spring force. As a result the conduit is securely held in place. On the other hand, if necessary the conduit or cable may also be manually pulled out of the retainer of the invention.

BRIEF DESCRIPTION OF THE DRAWINGS

The present invention is elucidated below in relation to an illustrative embodiment mode shown in the appended drawings.

FIG. 1 is a perspective view of the retainer in accordance with an embodiment of the invention, FIG. 2 is a side view of the retainer of FIG. 1, FIG. 3 is an enlarged scale view of that of FIG. 2.

DETAILED DESCRIPTION OF EMBODIMENTS

Figure 4:
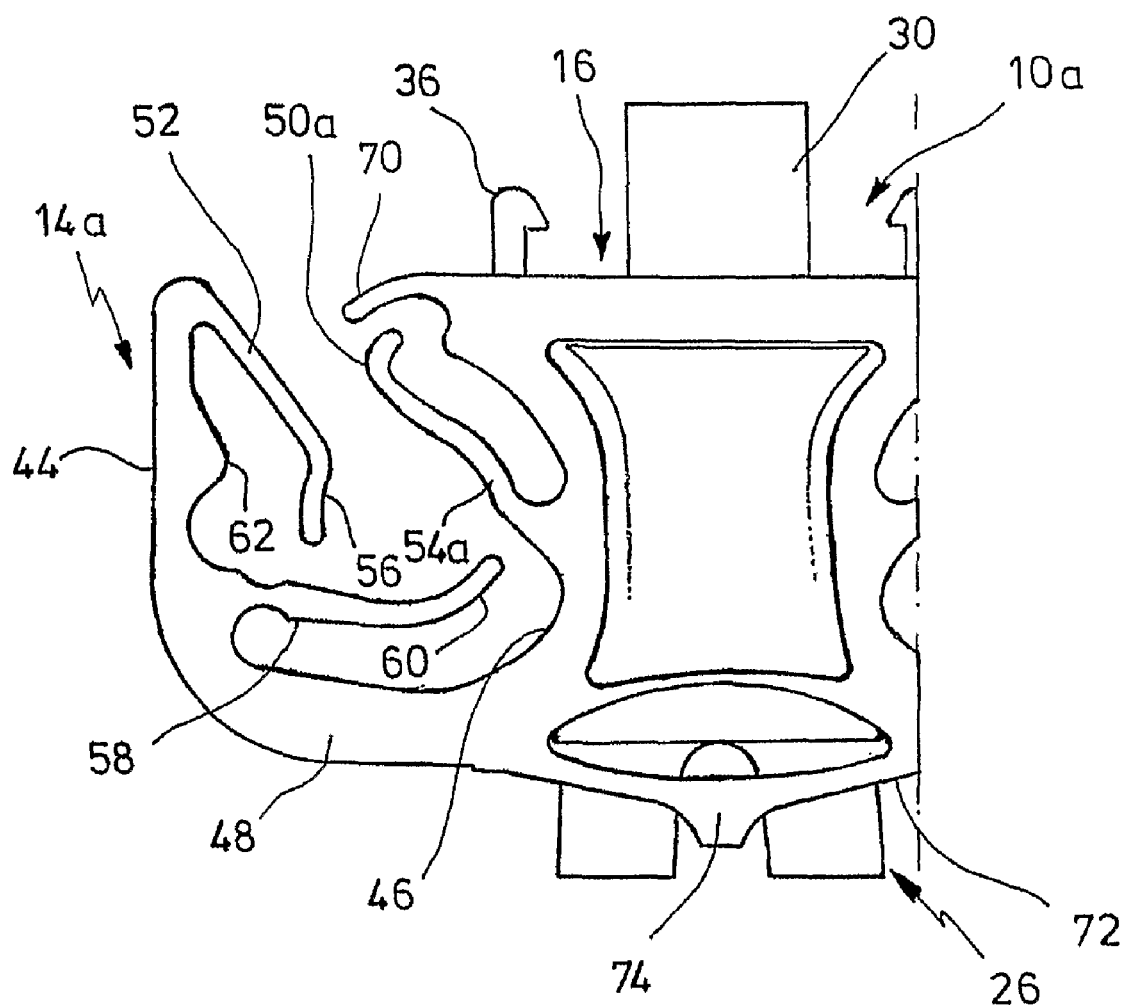
FIG. 4 shows another embodiment of a retainer of the invention.

FIGS. 1 through 3 show a retainer 10 comprising a single body having two retainer portions 12, 14 designed to receive two fluid conduits indicated in FIG. 2. The retainer portions 12, 14 are integral with an fastener portion 16. The fastener portion 16 comprises an upper wall 18 and a lower wall 20 that are connected by a front wall 22 and a rear, opposite wall (not visible). The rear wall is not shown in FIG. 1. As indicated in FIG. 1, the upper and lower walls 18, 20 are connected to each other centrally by a hollow, approximately cylindrical element 24. The cylindrical element 24 opens downward into an expansion rivet 26 comprising circumferentially equidistant resilient legs 28. A cylindrical pin 30 having an elongated flat head 32 is integrated into the top side of the wall portion 18. The head 32 is fitted at each of its opposite sides with a groove 34. When mounting the fastener portion 16 in a hole of an omitted automobile body part, first the expansion rivet 26 will be inserted into said hole. Next the head 32 is struck and the pin 30 is forced through the cylindrical element 24 into the expansion rivet 26, whereby the resilient legs 28 are bent outward, the retainer thus being secured in the automobile body part's hole. Two hook-shaped protrusions 36 are constituted at the top side of the wall portion 18 and engage the associated groove 34 once the pin 30 has been fully hammered into place. In this manner the pin 30 is held in place securely and no longer may be moved upward.

A resilient lip 40 is constituted at the lower wall portion 20 on each of the opposite sides. The resilient lip 40 is reinforced (thicker) at its free end and rests centrally against the associated surface of the omitted automobile body part and is stressed thereby. As a result a force is centrally applied between the automobile body part and the retainer 10, whereas the retainer bodies maintain a given spacing from the omitted automobile body part.

The retainer portion 12 is discussed in further detail below. The retainer portion 14 is designed identically and therefore this discussion describes it as well.

The retainer portion 12 comprises an outer, U-shaped portion 42 having an outer leg 44, an inner leg 46 and a connecting yoke 48. As regards FIGS. 2 and 3, the inner leg 46 is connected to the wall 22. As shown especially clearly in FIG. 3, the inner leg 46 is fitted at its upper end with a section 48 bent toward the leg 44. Resilient arms 50, 52 are constituted at the outer ends of the legs 44 and 46, respectively. In turn the resilient arms are fitted at their ends with arcuate engaging portions 54, 56, respectively. As shown by FIG. 2 indicating two secured conduits, the radii of the arcuate elements 54, 56 approximately match the radius of the conduits.

The resilient arm 52 runs downward at an acute angle relative to the leg 44 into the inside of the retainer portion 12. The resilient arm 50 initially runs slightly upward and then merges by means of an arcuate element into a nearly vertically downward element that is joined approximately orthogonally to the engaging portion 54. The resilient arms 50, 52 constitute a downwardly constricting insertion portion receiving the conduit to be affixed. In this process the resilient arms 50, 52 and especially arm 52 are deformed relative to the associated legs 44, 46 to allow receiving the conduit. The constricted cross-section between the resilient arms 50, 52 is less than the diameter of the received conduit.

As third resilient arm 58 runs near and parallel to the connection yoke 48 and is joined to the inside of the outer leg 44. Said arm 48 merges into another engaging portion 60. This engaging portion 60 also is arcuate. As shown in the drawings, the engaging portions 54, 56 and 60 may engage the conduit at sites approximately offset from each other by 120° and thus keep it in place. This feature is clearly shown in FIG. 2 The resilient arms 50, 58 exhibit a reduced cross-section near the junction to the associated leg and consequently they may yield elastically. The compliance of the resilient arm 52 is limited by a protrusion 62 constituted at the inside of the leg 44. When the resilient arm 52 rests against the protrusion 62, the outer leg of the retainer body and/or of the resilient arm 50 is prerequisite to retract the conduit from its retainer.

The cross of arrows 64 in the retainer portion 14 denotes the radial forces exerted by the conduit on the retainer portion when for instance the brake line starts vibrating upon ABS actuation. FIG. 3 very clearly shows that all conduit vibrations are easily and elastically caught by the resilient arms 50, 52 and 58. As a result the transmission of the forces so generated to the omitted automobile body part is much reduced.

The constricted cross-section subtended between the resilient arms 50, 52 at the inside end prevents accidentally dislodging the received conduit from the retainer 12, 14 However a displacement toward the constricted cross-section may entail deforming in particular the resilient arm 52: on the other hand this arm will rest against the said protrusion, and consequently the conduit remains securely in place between the engaging portions 54, 56 and 60. On the other hand the insertion of the conduit between said engaging portions requires only little force because the wedge angle between the resilient arms is small and the resilient arms 50, 52 are comparatively long.

If a received conduit must be removed from a retainer 12, 14, then it may be manually extracted, the constricted cross-section being widened enough to allow extracting said conduit. Where called for the other leg 44 too shall be bent outward to release the conduit.

FIG. 4 partly shows a retainer 10a, that is only with one retainer body 14a, the retainer body configured on the opposite side of an fastener portion 16 being omitted from the figure. The same reference numerals will be used where there is congruence with the embodiment mode of FIGS. 1 through 3.

Again the resilient arms 52, 50a constitute the insertion portion for a conduit to be placed into the retainer body 14a. The left part of the retainer body 14a of FIG. 4 corresponds in its design to the retainer bodies 14, 12 of FIGS. 1 through 3. In FIG. 4, a resilient arm 50a is constituted at the inside of the leg 46 and runs approximately parallel to the resilient arm 52 toward the aperture of the insertion portion. Accordingly an arcuate engaging portion 54a is situated between the ends of the resilient arm 50a. A bent-off arm 70 is constituted at the inner leg 46 above the curved end of the resilient arm 50a and runs toward the resilient 52. Accordingly the resilient arm 52 and the arm 70 subtend the aperture of the retainer body's insertion portion. When the conduit is inserted, the arm 70 will be slightly bent downward and in the process comes to rest against the bent around element of the resilient arm 50a which in turn is deflected jointly with the resilient arm 52 in order that the conduit may pass between the engaging portions 54, 56 and 60. Again the protrusion 62 limits dislodging the resilient arm 52.

The retainer shown in FIG. 4 functions in the same manner as the retainer of FIGS. 1 through 3.

A bridging spring element 72 is constituted underneath the fastener portion 16 and comprises a central, downward pointing boss 74. When the retainer 10a is being mounted on an automobile body part, the boss 74 engages its associated surface of the automobile body part and is thereby deformed upward. The boss 74 is the sole central rest of the retainer 10*a* against the automobile body part, as a result of which the connection yoke 48 and/or the leg 44 also can be deformed when related forces do arise during conduit insertion/retraction or in the presence of vibrations.

The invention claimed is:

1. A retainer for an automotive conduit, comprising:
a retainer body having
    a fastener portion configured to be mounted to an automobile body part,
    first, second, and third resilient arms for dampening conduit vibrations,
    a constricting insertion portion, and
    at least one conduit receiving portion,
wherein the retainer body is integrally molded of a plastic material;
wherein the receiving portion comprises three or more engaging portions which are arranged circumferentially to engage the conduit and are connected by the first, second, and third resilient arms to the retainer body in a manner that, in the event of conduit vibrations, the first, second, and third resilient arms configured to yield easily and elastically in all axial and radial directions decouple vibration-induced forces from the automobile body part;
wherein the fastener portion comprises
    a top side and a bottom side, and
    at least one resilient portion disposed centrally at the bottom side for resting against an associated surface of the automobile body part, the at least one resilient portion configured such that the retainer body maintains a given spacing from the automobile body part;
wherein the three or more engaging portions have arcuate rest faces configured to approximately match the conduit radius;
wherein the retainer body exhibits an external, approximately U-shaped portion having an inner leg, an outer leg, and one connection yoke between the legs;
wherein the first and second resilient arms are bound to free ends of the outer and inner legs, respectively, and form the conduit receiving portion;
wherein the third resilient arm is bound to an inside of the outer leg and runs approximately parallel to the connection yoke toward the inner leg; and
wherein a stop projection for the first resilient arm is formed at the inside of the outer leg of the U-shaped portion.

2. A retainer as claimed in claim 1, wherein
the first resilient arm is formed at the free end of the outer leg and runs obliquely inward, and
the second resilient arm is formed at an inside of the inner leg and runs obliquely outward.

3. A retainer as claimed in claim 1, wherein the resilient arms each comprise a portion of reduced cross-section.

4. A retainer as claimed in claim 3, wherein the portion of reduced cross-section is situated near the leg to which the resilient arm is bound.

5. A retainer as claimed in claim 1, comprising two or four said conduit receiving portions that are constituted symmetrically on opposite sides of said fastener portion.

6. A retainer for an automotive conduit, comprising:
a retainer body having
    a fastener portion configured to be mounted to an automobile body part,
    first, second, and third resilient arms for dampening conduit vibrations,
    a constricting insertion portion for insertion into the automobile body part, and
    at least one conduit receiving portion,
wherein the retainer body is integrally molded of a plastic material,
wherein the receiving portion comprises three or more engaging portions arranged circumferentially to engage the conduit, and are connected by the first, second and third resilient arms to the retainer body in a manner that, in the event of conduit vibrations, the first, second, and third resilient arms are configured to yield easily and elastically in all axial and radial directions and decouple vibration-induced forces from the automobile body part; part, and
wherein the fastener portion comprises
    a top side and a bottom side, and
    at least one resilient portion disposed centrally at the bottom side for resting against an associated surface of the automobile body part, the at least one resilient portion configured such that the retainer body maintains a given spacing from the automobile body part;
wherein the retainer body is approximately U-shaped, and comprises inner and outer legs and a connection yoke between the legs,
wherein the first resilient arm is formed at an outer end of the outer leg and runs obliquely inward,
wherein the second resilient arm is formed at an inside of the inner leg and runs obliquely outward,
wherein the first and second resilient arms constitute the conduit receiving portion,
wherein the third resilient arm is formed at an inside of the outer leg and runs as far as the inner leg and is approximately parallel to the connection yoke; and
wherein a stop projection for the first resilient arm is formed at the inside of the outer leg of the U-shaped portion.

* * * * *